(12) United States Patent
Gutzmer et al.

(10) Patent No.: US 6,282,271 B1
(45) Date of Patent: Aug. 28, 2001

(54) MODEM PROTECTION DEVICE

(75) Inventors: Alan A. Gutzmer, Poway; George J. Wasemiller, Oceanside, both of CA (US)

(73) Assignee: Gutzmer Enterprises, Ltd., San Diego, CA (US)

( * ) Notice: Subject to any disclaimer, the term of this patent is extended or adjusted under 35 U.S.C. 154(b) by 0 days.

(21) Appl. No.: 09/226,429

(22) Filed: Jan. 6, 1999

(51) Int. Cl.$^7$ .................................................. H04M 11/00
(52) U.S. Cl. ............................ 379/93.05; 379/2; 379/27; 379/222
(58) Field of Search .................................. 361/54, 78, 87, 361/82, 88, 91.1, 91.2, 117, 119, 91.3, 93.9; 379/412, 2, 32, 399, 93.01, 382, 413, 377; 340/657, 635, 660, 664

(56) References Cited

U.S. PATENT DOCUMENTS

| 4,395,590 | 7/1983 | Pierce et al. . |
| 5,539,801 | 7/1996 | Herh et al. . |
| 5,778,071 | 7/1998 | Caputo et al. . |
| 5,783,999 | 7/1998 | Price et al. . |
| 5,802,151 | 9/1998 | Bevill, Jr. et al. . |

OTHER PUBLICATIONS

*The Modem Protector*, Advertisement for modem on web page, http://www.sandman.com/protect.html, Oct. 26, 1998.
*Modem Saver*, by Teleadapt Busienss Solution, advertisement located on web page, http://www.teleadapt.com/web/Catalogue/Access/mdmsvr, Sep. 23, 1998.
*Modem Saver Line Testers*, by Modem Saver Plus, advertisement on web page, http://warrior.com/connectit/Modem-Saver.html, Sep. 23, 1998.
*Modem Protector Technical Bulletin*, Mike Sandman, Sep. 23, 1998, located on web page, http://www.sandman.com/modpbul.html.

*Primary Examiner*—Creighton Smith
(74) *Attorney, Agent, or Firm*—Brown, Martin, Haller & McClain

(57) ABSTRACT

A device for protecting a modem against harmful telephone line signals or reversed polarity telephone line signals includes a telephone line interface couplable to a telephone line, a modem interface couplable to a modem communication port, a measurement circuit that measures the value of an electrical parameter of a signal on the telephone line, an indicator circuit that provides an indication if the value of the parameter is not within predetermined limits, an isolation circuit that electrically isolates the modem communication port from the telephone line if the value of the parameter is not within predetermined limits, and a polarity detection circuit that determines the polarity of the telephone line with respect to the polarity of the modem communication port and reverses the polarities with respect to one another if they are opposite. Such operation of the apparatus may be initiated automatically in response to detection of an off-hook condition of the modem. A power control circuit disconnects the measurement circuit from the telephone line interface after such operation is completed to reduce the load on the telephone line.

18 Claims, 3 Drawing Sheets

MODEM PROTECTION DEVICE

BACKGROUND OF THE INVENTION

1. Field of the Invention

The present invention relates generally to computer modems and communication devices and, more specifically, to a device that couples between a modem and a telephone line to prevent damage to the modem as a result of dangerous line conditions.

2. Description of the Related Art

A modem is a device that modulates data received from a computer so that it can be transmitted via a telephone line and demodulates data received from a telephone line so that it can be provided to a computer. A modem may be integrated internally into a computer or may be external in a separate enclosure and connected to a computer by a cable. To connect the modem to the telephone line, a user typically plugs one end of a cable into the modem and the other end into a telephone wall jack. Telephone wall jacks are commonly provided in homes, businesses, hotels and other buildings to provide access to the public telephone network. In the United States, wall jacks conform to the standard known as RJ-11. A RJ-11 jack has four pins that mate with four pins of a RJ-11 plug on the cable.

Plugging a modem into a wall jack can, under certain circumstances, cause damage to the modem. Many wall jacks used in businesses are not directly coupled to the public switched telephone network (PSTN), but rather are coupled to a private branch exchange (PBX) system, which is in turn coupled to the PSTN. A PBX system is owned by the business and provides telephone service to many extension lines in various locations, intercom service between extensions, and myriad other communication features. All modern PBX systems are digital. That is, some of the signals they provide at the wall jack corresponding to each extension are digital. The digital signals are used for controlling the operation of the digital telephone that is plugged into the wall jack. If a user plugs an ordinary modem directly into the wall jack of a PBX extension, the modem can be damaged by the digital signals, which typically provide current in excess of 500 milliamps (mA). Modems are designed to receive only the signals provided at the wall jack coupled directly to the PSTN, and those signals typically provide only tens of milliamps of loop current.

A modem can be damaged by other causes as well. Plugging a modem designed in accordance with the telephone line standards of one country into a wall jack in another country could damage it if the voltage, current or other parameters of the two countries' standard telephone line signals are incompatible. Modems can also be damaged by power surges that sometimes occur as a result of lightning striking a telephone line or other events.

Commercially available products exist that attempt to address some of the above-described problems. One such product is a line tester having warning indicator lights that illuminate if a user plugs it into a wall jack that provides current in excess of about 90 mA or that provides signals of polarity opposite that of the modem. Although most modems will operate regardless of the signal polarity of the telephone line, the operation of certain modems may be degraded if the modem polarity is opposite the telephone line polarity. Another such product is similar in that it has warning indicator lights that illuminate if a user plugs it into a wall jack that provides excessive current or that provides signals of polarity opposite that required by modems. In addition, it has another jack into which the user can plug the modem cable if the indicator light indicates safe conditions by remaining un-illuminated. It also has a switch that a user can toggle to reverse the polarity of the wall jack with respect to the polarity of the modem jack. It further has a surge-protection circuit that limits the current to the modem. Still another such product has a surge-protection circuit that maintains a constant loop current, a reversed-polarity indicator light, and a switch for reversing the polarity.

The above-mentioned products are inconvenient to use and require the user to perform a number of steps. Observing an indicator light and then plugging in a modem only if it remains un-illuminated requires some degree of understanding by the user of the excessive current problem and involves multiple steps. Similarly, observing an indicator light and then toggling a switch to reverse polarity requires some degree of understanding by the user of the polarity problem and involves multiple steps. Furthermore, the surge-protection circuits of these products may provide inadequate protection for the modem under certain circumstances. It would be desirable to provide a modem protection device that provides a higher level of protection and is easy to use.

These problems and deficiencies are clearly felt in the art and are satisfied by the present invention in the manner described below.

SUMMARY OF THE INVENTION

The present invention relates to an electronic device and method for protecting a modem against harmful telephone line signals or reversed polarity telephone line signals. The device includes a telephone line interface and a modem interface that include suitable connectors. The telephone line interface is coupled to a telephone line in a suitable manner, such as by a user connecting them with a cable. The modem interface is similarly coupled to the communication port of a modem in a suitable manner, such as by a user connecting them with a cable or by an integral, hard-wired connection. The device is connected to both the telephone line and the modem and couples them in a manner that protects the modem against potentially harmful telephone line conditions. Operation of the device as described below begins automatically in response to a user connecting the device to the telephone line. A user need not press any buttons or perform other actions to use the device.

In embodiments of the invention, the apparatus may include a measurement circuit that determines whether a value of a predetermined electrical parameter of a signal provided by the telephone line is within predetermined limits. For example, it may determine whether the loop current is less than a predetermined maximum that is harmful to most modems. Such an apparatus may further include an indicator circuit that indicates to the user whether the value of that parameter is within those predetermined limits. For example, the indicator circuit may cause a light to illuminate if the current exceeds the predetermined maximum.

In embodiments of the invention, the apparatus may include a measurement circuit of the type described above and an isolation circuit that electrically isolates the modem from the telephone line if the value of the parameter is not within the predetermined limits. For example, the isolation circuit may isolate the modem from the telephone line if the current exceeds the predetermined maximum.

In embodiments of the invention, the apparatus may include a polarity detection circuit that determines the polarity of the telephone line with respect to the polarity of the modem communication port. If the polarity of the telephone line is opposite the polarity of the modem communication port, modem performance could be degraded, and a polarity reversal circuit reverses the polarity of the telephone line with respect to the polarity of the modem communication port, thereby improving the potential performance of the modem.

The above-described features of embodiments of the present invention may be included in various combinations with each other or in combination with other features. Such other features may include, for example, an off-hook circuit that automatically initiates operation of the measurement and indication circuits when an off-hook condition is detected at the modem communication port. Such other features may also include a power control circuit that disconnects the measurement circuit from the telephone line when such operation is completed, thereby reducing the load on the telephone line.

The foregoing, together with other features and advantages of the present invention, will become more apparent when referring to the following specification, claims, and accompanying drawings.

BRIEF DESCRIPTION OF THE DRAWINGS

For a more complete understanding of the present invention, reference is now made to the following detailed description of the embodiments illustrated in the accompanying drawings, wherein.

DESCRIPTION OF A PREFERRED EMBODIMENT

Figure 1:
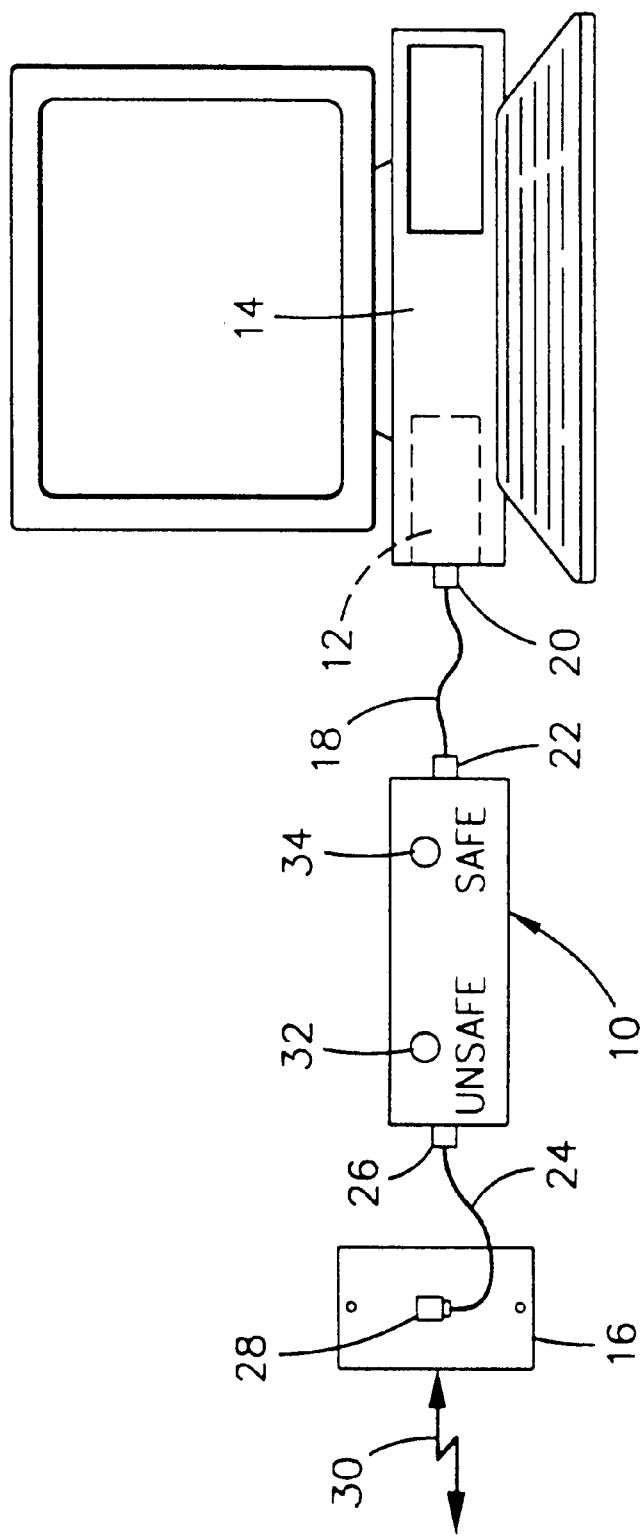
FIG. 1 is a block diagram of a modem protection device.

As illustrated in FIG. 1 (not to scale), a modem protection device 10 couples the modem 12 of a computer 14 to a telephone wall jack assembly 16. That is, a user plugs one end of a cable 18 into the telephone line jack 20 of modem 12 and plugs the other end of cable 18 into the device modem jack 22 of modem protection device 10. Similarly, the user plugs one end of a cable 24 into the device telephone jack 26 of modem protection device 10 and plugs the other end of cable 24 into the jack 28 of telephone wall jack assembly 16. The jacks and plugs conform to the RJ-11 standard for telephone equipment. Jack 28 is that which is commonly mounted in the wall of a room in a home, office, hotel or other location at which telephone service is available and, as explained below, depending upon the circumstances, may be either correctly coupled to the public switched telephone network (PSTN) or incorrectly coupled to a private branch exchange (PBX) or similar private telephone switching equipment.

If a user were to couple modem 12 to a PBX-type telephone system in this manner, modem 12 could not operate properly because the signals that modem 12 communicates are analog, but the signals 30 a PBX-type system communicates are digital and include signals relating functions relating solely to the PBX-type telephone instrument (not shown) that is intended to be plugged into jack 28. Not only would analog telephony equipment, such as a standard telephone and analog modem 12, not operate properly if coupled to a PBX-type telephone system in this manner, but modem 12 and other such telephony equipment could be damaged by signals 30 because the current or other parameters are typically outside the limits at which modem 12 is designed to operate. Even if a user correctly were to correctly couple modem 12 to the PSTN, modem 12 could also be damaged if any parameters of signals 30 were outside the limits at which modem 12 is designed to operate, as may occur, for example, when a modem 12 manufactured in one country is coupled to the PSTN of a foreign country.

Modem protection device 10 provides features that protect modem 12 and enhance operation of modem 12. One such feature is that modem protection device 10 protects modem 12 against damage by electrically isolating modem 12 from the telephone line and illuminating a red light-emitting diode (LED) 32 if the signals 30 at jack 28 exceed predetermined limits. If signals 30 are within the predetermined limits, modem protection device 10 maintains modem 12 coupled to the telephone line and illuminates a green LED 34 for approximately 10–15 seconds to indicate that conditions are safe for operation of modem 12. After that time, modem protection device 10 disconnects or decouples its measurement circuitry from the telephone line to avoid loading the telephone line. In other embodiments of the invention, other suitable indications of the safe or unsafe condition may be included in addition or alternatively to LEDs 32 and 34. An important feature is that the comparison of signals 30 to the predetermined limits and corresponding indication of the result by means of LEDs 32 and 34 occurs automatically upon the user coupling device 10 to the telephone line and also upon modem 12 going off-hook. Another important feature is that modem protection device 10 senses the polarity of the signals at jack 28 with respect to the signals at jack 20 of modem 12 and reverses the polarity if the polarities are opposite.

Figure 2A:
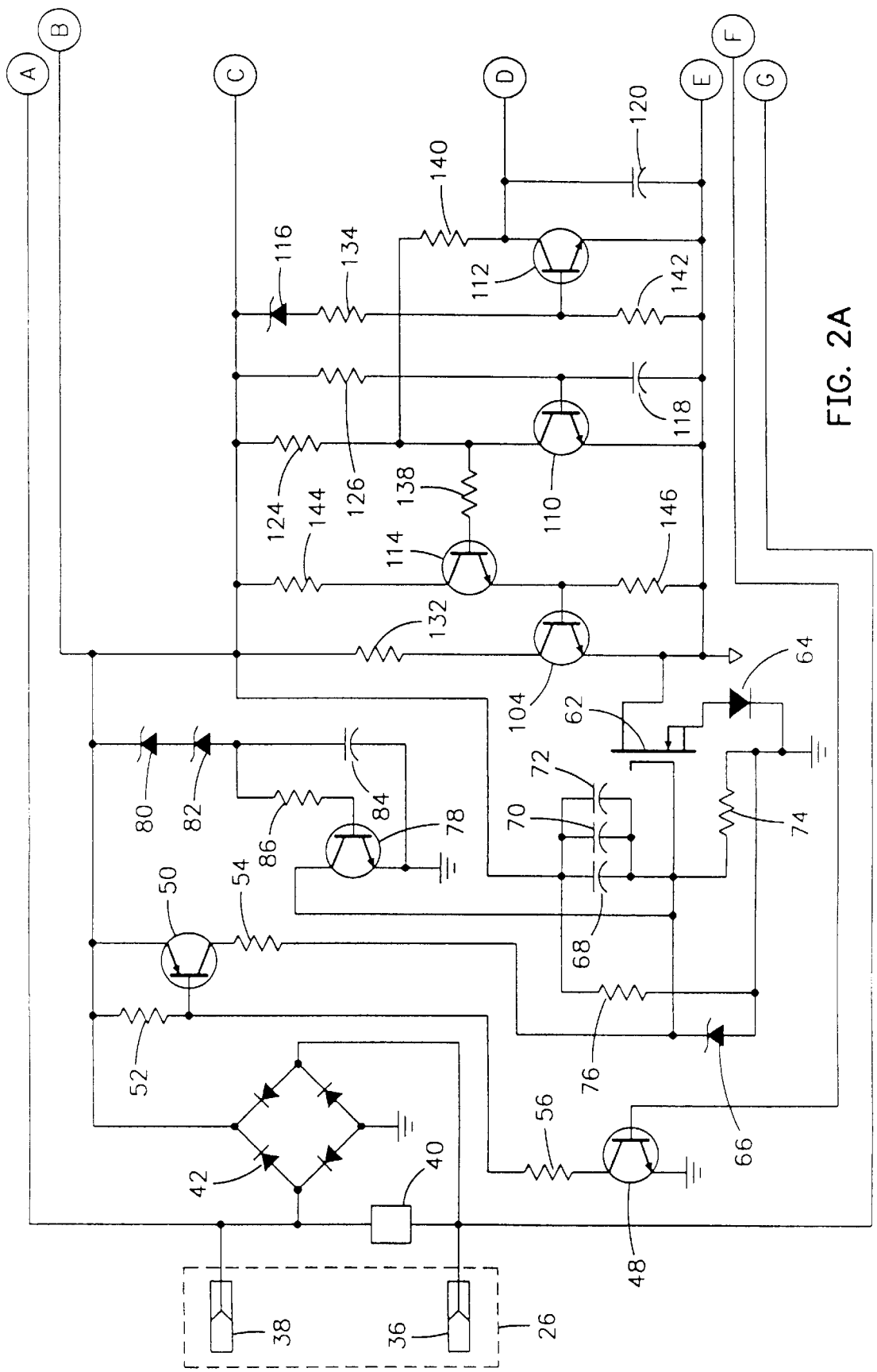
FIG. 2A is a schematic circuit diagram of the device.
Figure 2B:
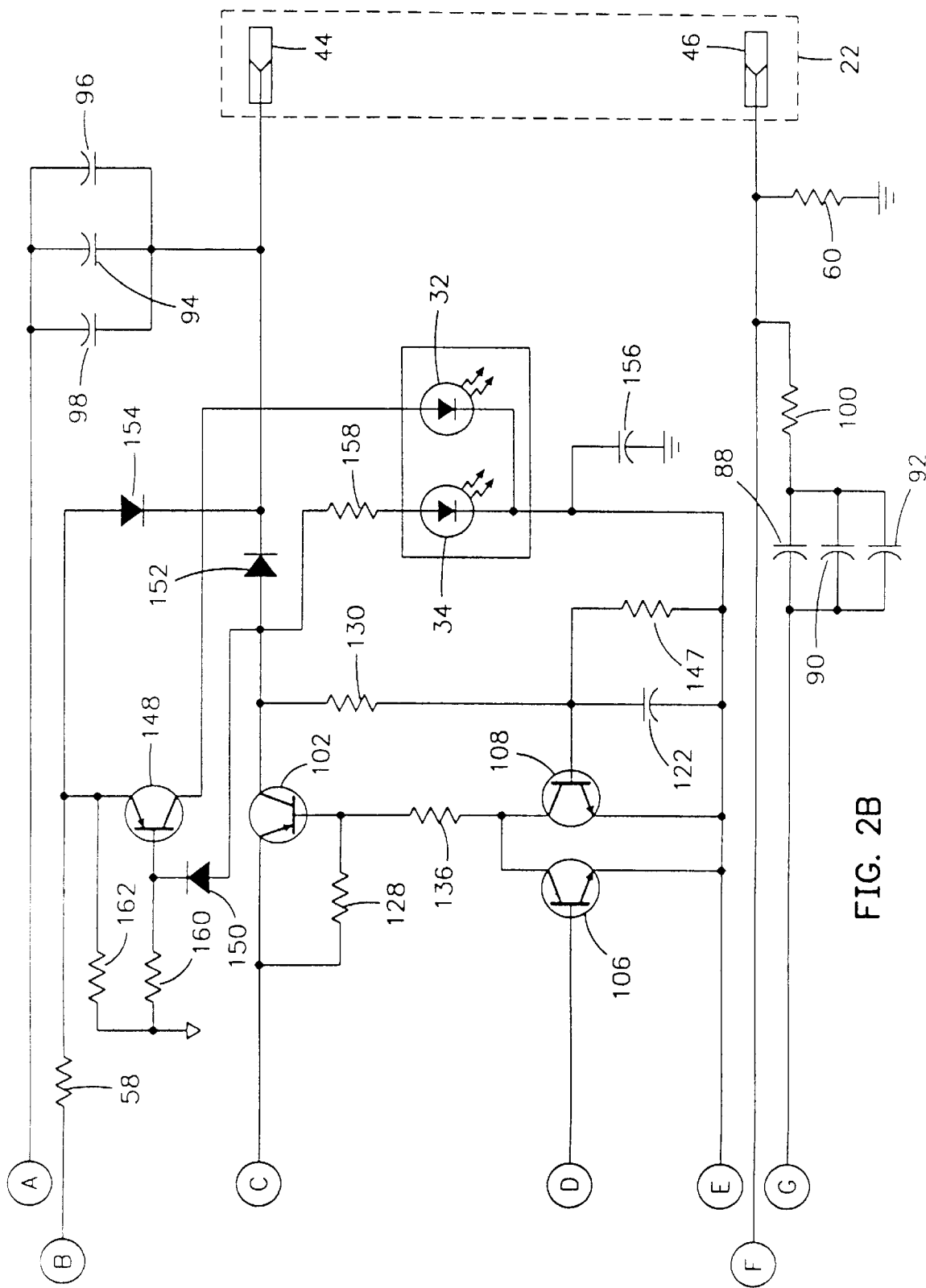
FIG. 2B is a continuation sheet of FIG. 2A.

With reference to FIG. 2, the telephone line interface circuitry includes terminals 36 and 38 of jack 26. A surge protector 40 connected across terminals 36 and 38 clamps voltages exceeding 300 volts to protect the remainder of the circuitry and modem 12. Two terminals of a bridge rectifier 42 are also coupled across terminals 36 and 38. Bridge rectifier 42 produces at its other two terminals signals of the proper polarity with respect to modem 12 regardless of the polarity of the telephone line signals. Stated another way, if the polarity of the telephone line is opposite the polarity of the input circuitry of modem 12, bridge rectifier 42 reverses the polarity of its output signals.

The modem interface circuitry includes terminals 44 and 46 of jack 22. Circuitry that energizes or provides power to other circuitry upon the detection of an off-hook condition of modem 12 includes two transistors 48 and 50, and five resistors 52, 54, 56, 58 and 60. When an off-hook condition exists, i.e., an external device such as modem 12 has placed a resistive load across terminals 44 and 46, a positive DC voltage provided via resistor 58 exists across terminals 44 and 46. The voltage causes transistor 48 to turn on, which creates a voltage divider circuit with resistors 52 and 56. Also, when transistor 48 is on, it provides a low impedance connection (0.6 volts) between terminal 46 and ground. The voltage drop at the base of transistor 50 causes transistor 50 to turn on. When transistor 50 is on, it provides a DC voltage, current-limited by resistor 54, to the gate of transistor 62, which is a N-channel DMOS FET. When the voltage at the gate of transistor 62 exceeds approximately 1.5 volts, transistor 62 is on and the potential at the drain of transistor 62, which represents the ground potential of circuitry that is automatically energized and de-energized as described herein, is equal to the potential at the source of transistor 62, which is coupled to the main electrical ground of device 10 via a diode 64. The connection of the circuit ground to main ground energizes the remaining circuitry and allows the measurement, indication and isolation circuitry to operate as described herein. A 18 volt zener diode 66 limits the voltage at the gate of transistor 62 to 18 volts and prevents the gate-to-source voltage from exceeding the manufacturer's recommended maximum.

Circuitry that limits the duration of energization of the measurement and indication circuitry includes capacitors 68, 70 and 72 and resistors 74 and 76. The duration is a function of this R-C network, and R and C values are preferably selected to provide a duration of approximately 10–15 seconds. After the 10–15 seconds, capacitors 68, 70 and 72 become charged, and the gate voltage of transistor 62 reaches the same potential (or lower) as the source voltage of transistor 62, causing transistor 62 to turn off. When transistor 62 is off, the circuit ground is decoupled from the main ground, thereby de-energizing the measurement, indication and isolation circuitry that is dependent upon the circuit ground. Resistor 76 provides a discharge path for capacitors 68, 70 and 72.

As described above, transistor 62 acts as the main "on/off switch" for the measurement, indication and isolation circuitry. It is turned on by two conditions, one being detection of an off-hook condition at jack 22 (terminals 44 and 46) and the other being the charging of capacitors 68, 70 and 72. This charging begins upon the coupling of terminals 36 and 38 to a telephone line or upon the return of an on-hook condition to terminals 44 and 46. In other words, transistor 62 turns the circuitry on in response to a user plugging device 10 into a telephone jack-28 or upon modem 12 returning to an on-hook state after having been off-hook. Diode 64 lifts the source of transistor 62 0.6 volts above ground to compensate for potential leakage in capacitors 68, 70 and 72 that could otherwise cause transistor 62 to turn on.

Circuitry that maintains transistor 62 off in the presence of a ring signal on the telephone line includes a transistor 78, zener diodes 80 and 82, a capacitor 84, and a resistor 86. A ring signal is approximately 180–200 volts peak-to-peak at 20 Hz. If such a signal is present at terminals 36 and 38, it will cause transistors 48 and 50 to turn on. To prevent the undesirable potential result of transistor 62 turning on and energizing the measurement and indication circuitry, the conduction of diodes 80 and 82, which occurs when the voltage across them exceeds about 150 volts, causes transistor 78 to turn on. When transistor 78 is on, the gate of transistor 62 is clamped to ground, preventing transistor 62 from turning on. Capacitor 84 reduces the pulsing of transistor 78 during the ring cycle.

Although it is not desirable for the measurement and indication circuitry of device 10 to operate when the telephone line is rung, it is nonetheless desirable for device 10 to pass the ring signal through to modem 12 because modem 12 may be set to a state in which it can receive incoming telephone calls. The circuitry that performs this ring signal pass-through function includes capacitors 88, 90, 92, 94, 96 and 98, which pass the AC ring signal but block potentially harmful DC current, and a resistor 100, which increases the AC impedance when modem 12 is connected or negotiating with a remote modem.

The majority of the remaining circuitry performs the functions of determining whether the loop current of the telephone line signal exceeds a threshold value and, if so, isolating modem 12 from the telephone line. This circuitry includes transistors 102, 104, 106, 108, 110, 112 and 114, a diode 116, capacitors 118, 120 and 122, and resistors 124, 126, 128, 130, 132, 134, 136, 138, 140, 142, 144, 146 and 147. As described above, this circuitry is automatically energized or powered via transistor 62 in response to detection of the coupling of device 10 to the telephone line. When the circuitry is powered-up in this manner, capacitor 118 begins to charge and preferably takes about 100 ms to become charged. During this charge time the base of transistor 110 is held low, maintaining transistor 110 off. When transistor 110 is off, transistor 114 is on, which turns transistor 104 on. The preferred criterion for characterizing a telephone line condition as potentially harmful to modem 12 is that the telephone line voltage exceeds 13.2 volts when a 300 ohm load is applied. When transistor 104 is on, resistor 132, which preferably has a value of 300 ohms, is coupled across the telephone line at terminals 36 and 38. When transistor 110 is off, transistor 106 is also on if transistor 112 is off. Transistor 112 is controlled by the conduction of diode 116, which is preferably a 12 volt zener. If the telephone line voltage, i.e., the voltage across terminals 36 and 38, is greater than 13.2 volts when resistor 132 is coupled across the telephone line, transistor 112 will prevent transistor 106 from turning on. When capacitor 118 is charged transistor 110 turns on, which turns off transistors 114, 104 and 106. When transistor 104 is off, resistor 132 (the 300 ohm load) is removed from the telephone line. Transistor 102 controls whether modem 12 is connected to or isolated from the telephone line. Transistor 102 is initially controlled by transistor 106 during the 100 ms testing interval. If during this 100 ms interval the telephone line condition is determined to be safe as described above, i.e., the voltage across the telephone line does not exceed 13.2 volts with the 300 ohm load applied, transistor 106 is on, which turns transistor 102 on. When transistor 102 is on, transistor 108 is turned on, which latches transistor 102 on until transistor 62 removes the ground connection as described above. When transistor 102 is on, the modem interface at terminals 44 and 46 of jack 22 is coupled to the telephone line interface at terminals 36 and 38 of jack 26. If, however, during this 100 ms interval the telephone line condition is determined to be harmful or unsafe to modem 12 as described above, i.e., the voltage across the telephone line exceeds 13.2 volts with the 300 ohm load applied, transistor 106 remains off, which maintains transistor 102 off. When transistor 102 if off, the modem interface at terminals 44 and 46 is isolated from the telephone line interface at terminals 36 and 38.

The remaining circuitry provides an indication of whether the telephone line condition is safe or unsafe, by illuminating either LED 34 or LED 32, respectively. This circuitry includes a transistor 148, diodes 150, 152 and 154, a capacitor 156, resistors 158, 160 and 162, and LEDs 32 and 34. If the telephone line is determined to be safe, transistor 102 is on, which provides voltage to LED 34 through resistor 158, causing it to illuminate. The green light indicates to the user that the telephone line is safe for operation of modem 12. When transistor 102 is on, sufficient voltage is provided to the base of transistor 148 through diode 150 to turn transistor 148 off. When transistor 148 is off, LED 32 will not illuminate. If, however, the telephone line is determined to be unsafe, transistor 102 remains off. When transistor 102 is off, the base voltage of transistor 148 is lower than its emitter voltage via the voltage divider defined by resistors 160 and 162, causing transistor 148 to turn on. When transistor 148 is on voltage is provided to LED 32, causing it to illuminate. The red light indicates to the user that the telephone line is unsafe for operation of modem 12. Diode 152 blocks the voltage at resistor 58 from causing LED 34 to illuminate. Diode 154 blocks current from entering the indication circuit during the ring cycle.

The modem protection device is convenient to use because it operates automatically in response to a user plugging it into a telephone wall jack. The user need not press any buttons to initiate operation. If the user plugs the device into the wall jack and the red LED illuminates, the user understands that conditions are potentially harmful or otherwise unsuitable for modem operation. If the user plugs the device into the wall jack and the green LED illuminates, the user understands that the modem can be operated. The device not only automatically provides these indications but also automatically electrically isolates the modem from the telephone line if conditions are determined to be potentially harmful or otherwise unsuitable for modem operation. Furthermore, if a condition of reversed polarity exists on the telephone line, the device automatically corrects it or compensates for it to enhance modem operation.

It will be evident that there are numerous embodiments of the present invention, which, while not specifically described above, are clearly within the scope and spirit of the invention. Consequently, the above description is considered to be exemplary only, and the full scope of the invention is to be determined solely by the appended claims.

What is claimed is:

1. An apparatus for protecting a modem, comprising:
   a telephone line interface having a connector couplable to a telephone line;
   a modem interface having a connector couplable to a communication port of a modem, said modem interface coupled to said telephone line interface to provide a communication signal path;
   a measurement circuit coupled to said telephone line interface, said measurement circuit including a plug-in activation circuit detecting the coupling of said telephone line interface to a telephone line, said measurement circuit, in response to detection of the coupling of said telephone line interface to a telephone line, determining whether a value of a predetermined electrical parameter of a signal on said telephone line is within predetermined limits;
   an indicator circuit providing a human-perceptible indication if said value of said predetermined electrical parameter is not within said predetermined limits; and
   a power control circuit disconnecting said measurement circuit from said telephone line interface after said measurement circuit determines whether said value of said predetermined electrical parameter is within said predetermined limits and said indicator circuit provides said indication, said power control circuit comprising:
      a capacitor circuit coupled to said telephone line interface charging in response to current provided via said telephone line interface; and
      a transistor switch circuit coupled to said capacitor circuit switching between an on state and an off state in response to charging of said capacitor circuit to a predetermined threshold voltage.

2. The apparatus recited in claim 1, wherein said power control circuit further comprises a circuit that maintains said transistor switch in an off state in response to a ring signal on said telephone line.

3. The apparatus recited in claim 1, wherein said measurement circuit further comprises an off-hook activation circuit detecting an off-hook condition of a modem coupled to said modem interface, said measurement circuit, in response to detection of said off-hook condition, initiating operation of said measurement circuit and said indicator circuit.

4. The apparatus recited in claim 1, further comprising a surge protector coupled to said telephone line interface.

5. An apparatus for protecting a modem, comprising:
   telephone line interface means for coupling to a telephone line;
   modem interface means for coupling to a communication port of a modem, said modem interface means coupled to said telephone line interface means to provide a communication signal path;
   measurement means coupled to said telephone line interface, said measurement means including a plug-in activation circuit detecting the coupling of said telephone line interface to a telephone line, said measurement means, in response to detection of the coupling of said telephone line interface means to a telephone line, determining whether a value of a predetermined electrical parameter of a signal on said telephone line is within predetermined limits;
   indicator means for providing a human-perceptible indication if said value of said predetermined electrical parameter is not within said predetermined limits; and
   power control means for disconnecting said measurement means from said telephone line interface after said measurement means determines whether said value of said predetermined electrical parameter is within said predetermined limits and said indicator means provides said indication, said power control means comprising:
      capacitor means coupled to said telephone line interface for charging in response to current provided via said telephone line interface; and
      transistor means coupled to said capacitor circuit for switching between an on state and an off state in response to charging of said capacitor means to a predetermined threshold voltage.

6. The apparatus recited in claim 5, wherein said power control means further comprises a means for maintaining said transistor switch in an off state in response to a ring signal on said telephone line.

7. The apparatus recited in claim 5, wherein said measurement means further comprises an off-hook activation means detecting an off-hook condition of a modem coupled to said modem interface means, said measurement means, in response to detection of said off-hook condition, initiating operation of said measurement means and said indicator means.

8. The apparatus recited in claim 5, further comprising a surge protector coupled to said telephone line interface.

9. A modem protection device comprising:
   a modem interface for coupling said modem protection device to a telephone line to provide a communication signal path;
   a measurement circuit connected to said communication signal path, said measurement circuit comprising:
      a plug-in activation circuit for detecting the coupling of said telephone line to said modem interface; and
      an evaluation circuit for determining whether a value of a predetermined electrical parameter of a signal on said telephone line is within predetermined limits upon detection of the coupling of said telephone line to said modem interface;
   an indicator circuit for indicating that said value of said predetermined electrical parameter is not within said predetermined limits; and
   a power control circuit disconnecting said measurement circuit from said telephone line after said measurement circuit determines whether said value of said predetermined electrical parameter is within said predetermined limits and said indicator circuit provides said indication, said power control circuit comprising:

a capacitor circuit coupled to said modem interface charging in response to current provided via said telephone line; and a transistor switch circuit coupled to said capacitor circuit switching between an on state and an off state in response to charging of said capacitor circuit to a predetermined threshold voltage.

10. The modem protection device of claim 9, wherein said power control circuit further comprises a ring response circuit that maintains said transistor switch in an off state in response to a ring signal on said telephone line.

11. A modem protection device coupled to a telephone line for accepting a signal on the telephone line and providing a protected signal path from the telephone line to a modem couple to the modem protection device, the modem protection device comprising:

a measurement circuit couple to the telephone line and comprising an activation circuit for detecting the coupling of the telephone line to the modem protection device, the activation circuit for determining whether a value of a predetermined electrical parameter of the signal is within at least one predetermined limit;

an indicator circuit for indicating that the value of the predetermined electrical parameter is outside of the predetermined limits; and a power control circuit for disconnecting the measurement circuit from the telephone line after the measurement circuit determines whether the value of the predetermined electrical parameter is within the predetermined limits and the indicator circuit provides the indication, said power control circuit comprising:

a capacitor circuit for charging in response to current provided via the telephone line;

a transistor switch circuit coupled to the capacitor circuit for switching between an on state and an off state in response to the charging of the capacitor circuit to a predetermined threshold voltage; and a ring response circuit for maintaining the transistor switch in an off state in response to a ring signal on the telephone line.

12. The modem protection device as in claim 11, wherein the measurement circuit further comprises an off-hook activation circuit for detecting an off-hook condition of the modem coupled to the modem protection device, the measurement circuit initiating operation of the measurement circuit and the indicator circuit in response to a detection of the off-hook condition.

13. The modem protection device as in claim 11, further comprising a surge protector coupled to said telephone line.

14. A device for protecting a modem, comprising:

telephone line interface means for coupling to a telephone line;

modem interface means for coupling to a communication port of a modem, said modem interface means coupled to said telephone line interface means to provide a communication signal path;

measurement means coupled to said telephone line interface, said measurement means comprising a plug-in activation circuit detecting the coupling of said telephone line interface to a telephone line, said measurement means determining whether a value of a predetermined electrical parameter of a signal on said telephone line is within predetermined limits in response to detection of said coupling of said telephone line interface means to a telephone line;

indicator means for providing a human-perceptible indication if said value of said predetermined electrical parameter is within said predetermined limits; and power control means for disconnecting said measurement means from said telephone line interface after said measurement means determines whether said value of said predetermined electrical parameter is within said predetermined limits and said indicator means provides said indication, the power control means comprising:

capacitor means coupled to said telephone line interface for charging in response to current provided via said telephone line interface; and transistor means coupled to said capacitor circuit for switching between an on state and an off state in response to charging of said capacitor means to a predetermined threshold voltage.

15. The device as in claim 14, wherein said power control means further comprises a means for maintaining said transistor switch in an off state in response to a ring signal on said telephone line.

16. A modem protection device coupled to a telephone line for providing a communication signal path to a modem, the modem protection device comprising:

a modem interface means connected to the communication signal path and coupled to a communication port of a modem;

measurement means coupled to said communication signal path, said measurement means comprising a plug-in activation circuit detecting the coupling of said modem protection device to said telephone line, said measurement means determining whether a value of a predetermined electrical parameter of a signal on said telephone line is within predetermined limits in response to detection of said coupling of said telephone line interface means to a telephone line;

indicator means for providing a human-perceptible indication if said value of said predetermined electrical parameter is within said predetermined limits; and power control means for disconnecting said measurement means from said communication signal path after said measurement means determines whether said value of said predetermined electrical parameter is within said predetermined limits and said indicator means provides said indication, the power control means comprising:

capacitor means coupled to said communication signal path for charging in response to current provided via said telephone line; and transistor means coupled to said capacitor circuit for switching between an on state and an off state in response to charging of said capacitor means to a predetermined threshold voltage; and a means for maintaining said transistor switch in an off state in response to a ring signal on said telephone line.

17. The modem protection device as in claim 16, wherein said measurement means further comprises an off-hook activation means detecting an off-hook condition of the modem coupled to said modem interface means, said measurement means initiating operation of said measurement means and said indicator means in response to detection of said off-hook condition.

18. The modem protection device as in claim 16, further comprising a surge protector coupled to said telephone line.

* * * * *